Feb. 22, 1927.
R. R. MACHLETT
1,618,767
MANUFACTURE OF LUMINOUS ELECTRICAL DISCHARGE TUBES
Original Filed April 27, 1925   2 Sheets-Sheet 2
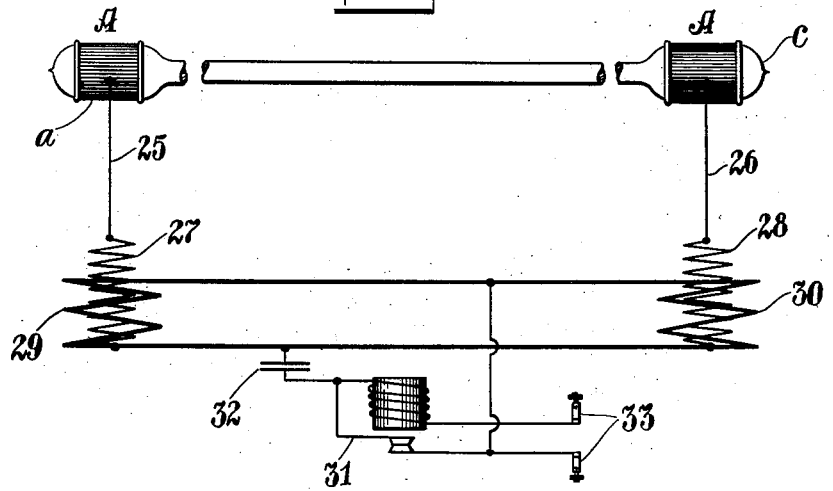
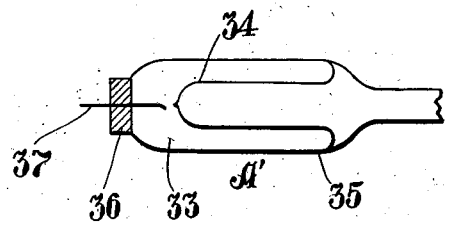
INVENTOR
BY
ATTORNEY Patented Feb. 22, 1927.

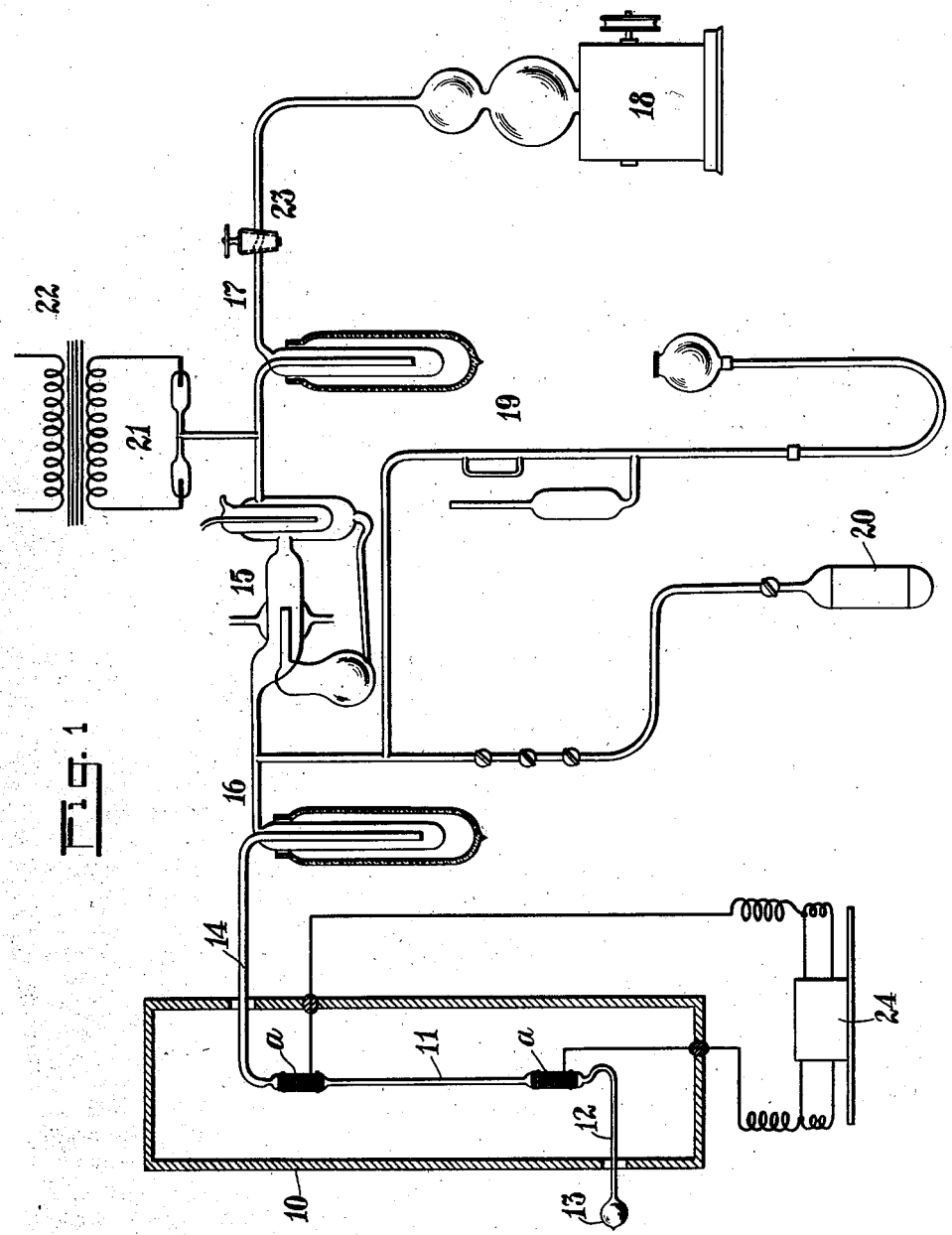

1,618,767

UNITED STATES PATENT OFFICE.

RAYMOND ROBERT MACHLETT, OF NEW YORK, N. Y.

MANUFACTURE OF LUMINOUS ELECTRICAL DISCHARGE TUBES.

Continuation of application Serial No. 26,128, filed April 27, 1925. This application filed September 24, 1926. Serial No. 137,548.

This invention relates to manufacture of luminous electrical discharge tubes; and it relates more particularly to the manufacture of such discharge tubes which are filled with a rarefied gaseous medium, such as neon or some other gas of the noble gas group. In luminous discharge tubes of the type here in question, it is of great importance that the rarefied gaseous medium be and remain substantially free of impurities tending to adversely affect the luminosity of said medium when the tube is in use. Furthermore, it is very desirable that the pressure of the gaseous medium in the tube shall remain substantially constant in order that the conductivity of said medium may not change materially.

It is a principal object of the present invention to provide a process for the manufacture of luminous discharge tubes whereby such tubes can be manufactured more easily and at less cost than heretofore, while at the same time the characteristics of such tubes can be improved in important respects. In general, this object is accomplished by subjecting the tube to a systematic preliminary treatment for elimination of occluded gaseous impurities from the walls thereof, after which pure or technically pure neon or other noble gas is admitted into the previously evacuated tube and the tube is sealed off, no purification of the neon after introduction into the tube being necessary to render the tube suitable and ready for use.

It has been proposed heretofore to degasify glass tubes intended for use as luminous discharge tubes by heating to temperatures of from 360° to 420° for a considerable time while exhausting the tube. Much of the occluded gaseous impurities can be eliminated from the glass in this way, but the method is extremely slow and requires the very best of equipment. Even under the most favorable conditions it is practically impossible by such prior methods to carry the de-gasification to such a point as to prevent gradual depreciation of the finished device through contamination of the contained gaseous medium from subsequent evolution of small quantities of gaseous impurities from the glass walls during continued operation.

According to the method of the present invention, the glass tube is so processed during the exhausting operation and before introduction of the rarefied gaseous medium that, after sealing and in subsequent operation and use, no appreciable amount of impurities is evolved from the glass. This result is accomplished with the aid of a purging agent employed in vapor form in a manner to be hereinafter described. As examples of such purging agents may be mentioned the alkali metals which have a strong chemical affinity for precisely such gases as are undesirable in the form of impurities in the luminous gaseous medium contained in the finished discharge tube or lamp and which, in the present process, are made to combine with such gases chemically and to aid in their removal from the tube. Purging agents of this general character have been used heretofore in the art but not, so far as I am aware, in the manner to be hereinafter set forth.

In carrying my invention into effect, I preferably make use of a metallic potassium as the alkali metal, the vapor of which is employed as a purging agent as will be hereafter described. This metal is preferred since its temperature of volatilization is conveniently low and hence it becomes possible to maintain the vapor in the tube without condensation at temperatures which are well below the point at which the glass walls of the tube may soften, particularly if the tube is made of high-melting point borosilica glass, as will be later explained. It will be understood however that other alkali metals may be employed, provided the tubes are composed of material which will permit the employment of temperatures sufficiently high as to prevent an objectionable degree of condensation of the vapor.

I find that when an alkali metal vapor is used as a purging agent within the tube, as will be explained, apparently the gaseous impurities are removed from the glass walls of the tube to such a depth, or that such impurities are changed in their chemical or physical state to such an extent, as to prevent any noticeable or appreciable contamination of the conducting gaseous medium during the life of the tube which may be in excess of five thousand hours. This purification or scouring of the tube walls is much more effective than could be secured by heat alone even if temperatures were used above the melting point of the glass. It seems to be a fact that by treating the tube in the manner hereafter explained with an alkaline vapor metal a chemical change occurs to a very considerable extent in the glass wall. The latter opinion is based upon the observed fact that glass after prolonged treatment can be made to combine only with difficulty with normal glass of the same initial composition.

It is by no means certain that the contamination to which the conducting gaseous medium may be subjected is due to the presence in the glass walls of occluded gaseous impurities and it is probable that the contamination which has heretofore been encountered and which lowers the life of the tube may be due to the decomposition of salts entering into the composition of the glass and which have a definite vapor pressure, such decomposition being the result of the electrical strain and instantaneous temperature conditions accompanying ionic bombardment of the tube walls. By subjecting the tube to the treatment with vapor of the alkaline metal as hereafter described, the vapor pressures of such salts are apparently reduced to a point where ionic bombardment no longer can affect decomposition or the liberation of impurities.

It is furthermore an important feature of the invention, in its more specific aspects, to construct the tube of high-melting-point boro-silica glass. This is for the reason that ordinary lead or flint glass is easily discolored and otherwise adversely affected when it is heated beyond certain critical values in the presence of alkali metal vapors. With high melting point boro-silica glass this discoloring may be entirely eliminated even though the temperature be very considerable, say of the order of 350°–400° C. while in contact with alkali metal vapor, which higher temperature is desirable in view of the fact that the rate of diffusion of the vapor through the tube is a function of temperature and by the use of such high temperature the time of processing may be considerably shortened and longer tubes may more easily be formed.

The use of high-melting point boro-silica or similar glass for the construction of luminous tubes is furthermore advantageous in view of the fact that glass of this character has great dielectric strength, a very important consideration when exterior electrodes are made use of and where the discharge within the tube is due to a capacity effect.

The present invention finds its greatest value with tubes employing exterior electrodes for the reason that when such electrodes are used very litle energy is developed within the tube and therefore the most favorable internal conditions are essential. Because of this fact, the presence of impurities in the gaseous conducting medium or variations in pressure of the conducting medium manifest themselves as deteriorating influences of much greater relative magnitude than when interior electrodes are used, with the consequent possibility of developing much greater energy within the tube. It has been found in fact that tubes may be made with exterior electrodes under the present invention where the maintenance of the desired conditions of composition and pressure of the gaseous medium may be so uniform as to give a life of from six thousand to ten thousand hours of continuous operation.

At the same time the invention is distinctly advantageous in connection with tubes employing internal electrodes for the reason that the process provides a way by which gaseous impurities may be rapidly and effectively removed from the walls of the tube and electrodes, thus permitting a tube after manufacture to be immediately used without the necessity of preliminary seasoning. Therefore, while the present invention is very specially advantageous in connection with tubes employing exterior electrodes and will be so claimed, yet certain of the claims hereafter to be made are so worded as to include interior electrodes as well.

The principles of the invention will be more fully understood from the following description of a practical embodiment of the method or process of the invention, wherein reference will be made to typical apparatus shown in the accompanying drawings, wherein—

Fig. 1 shows diagrammatically such an apparatus system suitable for use in carrying out the process;

Fig. 2 shows a finished lamp tube with exterior electrodes and an operating circuit therefor; and Fig. 3 shows a modified form of external electrode for such lamp tube.

Referring to the drawings, and more particularly to Fig. 1, 10 is an oven sufficiently large to contain the whole lamp or tube 11 and capable of raising the temperature of the tube evenly to 600° C. or higher, said oven being provided with suitable heating means, not shown. The tube 11 is most desirably of high-melting point boro-silica glass and is shown as being provided with external terminal electrodes each of which in this instance consists of a silver coating. These electrodes will be described in greater detail presently in connection with Fig. 2. To one end of the tube 11 is sealed an extension 12 connecting the tube with a small container 13 which is located outside the oven and contains an appropriate purging agent which in the present example is pure metallic potassium. To the other end of the lamp tube is sealed a glass tube 14 by means of which the tube is connected with an exhausting system of any appropriate type capable of producing an extremely high vacuum. The system as here shown comprises a mercury diffusion pump 15, supplied with the usual freezing traps 16, 17, and a force pump 18. The system comprises also a pressure gauge operatively connected, as shown at 19, to indicate the pressure in the lamp tube, and a gas container 20 connected with the system through suitable valved connections as shown.

For testing for the presence of gas, a spectrum tube 21 is connected with the system and supplied with high potential current at its terminals from an appropriate source 22, a valve 23 being provided for disconnecting the tube 21 from the pump 18 during testing. During the evacuation of the tube the test is made by closing the valve 23 and applying the proper potential to the terminals of the spectrum tube 21 while continuing the operation of the diffusion pump 15. The withdrawal of even very slight quantities of gas from the lamp tube 11 by the diffusion pump will in a few minutes time give a pronounced indication in the spectrum tube 21, thus providing a very delicate test. At one stage in the processing of the tubes, an electrical discharge is passed through the tube 11, and for this purpose a source 24 of high potential high frequency current is provided and arranged to apply potential to the terminals of the tube when desired through the connections indicated.

The method of processing the tube 11 and forming the complete lamp may be carried out in a typical instance as follows:

The tube which is assumed in this instance to be of high-melting boro-silica glass, is first throughly baked by heating it in oven 10 for a substantial period of time, say 15 or 20 minutes, at a relatively high temperature which should be above 300° C. and which, in a typical instance, may approximate 500° C. During this baking treatment, the high vacuum system is maintained in operation to dislodge most of the occluded gases and volatile material from the glass and to evacate the tube. This results in de-gasifying the glass to a point where most of the occluded gaseous impurities are removed. In order to substantially complete the de-gasification and also to ensure that there will be no further substantial evolution of contaminating gases from the glass after the finished lamp tube is operating in actual service, the tube is now subjected to a further de-gasifying and stabilizing treatment which constitutes an important feature of the invention in its best embodiments. With the high vacuum system still in operation, the heating of the oven is discontinued, the oven is opened and the tube is allowed to cool down considerably. Heat is now applied to the container bulb 13 and the metallic potassium is distilled over into the extension 12 inside of the oven but not as yet into the lamp tube 11. The container 13 and such portion of the tube 12 as extends outside the oven are now sealed off, the oven is closed again and heating is resumed until the tube is brought to a temperature of about 350° C. The potassium metal in the tube 12, being vaporized, diffuses into the lamp tube 11. The lamp tube is now excited by application of high frequency potential applied to its external terminal electrodes $a$—$a$ from the high frequency supply source 24. A high frequency current discharge is thus caused to pass through the tube while the alkali metal vapor permeates it. This causes a band of yellowish light, preceded by a short band of purplish light to diffuse through the tube from the end nearest extension 12 to the opposite end. Excitation of the tube under the conditions specified is continued until and for some minutes after the tube is filled with the yellowish light aforesaid, after which the electrical discharge is discontinued, the high vacuum system disconnected from the lamp tube, and the lamp tube cooled. Neon gas of the requisite purity is now admitted into the de-gasified and highly evacuated lamp tube until the proper pressure in the tube is attained. In practice this pressure may vary from 3 to 8 mms. of mercury absolute, or thereabouts, an absolute pressure of about 4 mms. being usual. Without further treatment, the tube 10 is then sealed off at both ends, being now complete and ready for use.

The term "pure neon" as employed herein signifies neon of such purity that in a tube of the type hereinabove described it will have sufficient conductivity and brilliancy to be commercially practical. For example, a commercially purified neon known as "neon-helium spectralrein", which is meon that has been spectroscopically tested and found to contain practically no impurities aside from helium, serves admirably in the practice of the present invention. Neon gas of this technical purity is obtainable on the market as a commercial product.

Instead of using the additional vessel 13 containing the purifying metal, other methods of obtaining a discharge of alkali metal through the tube may be utilized. For example, it is possible to heat certain areas of the glass walls of the lamp tube, by placing heating caps over such area, to a temperature at which it becomes electrically conductive, whereupon a certain amount of sodium may be electrolyzed out of the glass by applying a direct potential of suitable voltage and polarity between these heated areas. If the tube is maintained at a temperature so high that the metal is vaporized to some extent and not recondensed within the tube, the alkali metal vapor will be caused to diffuse through the tube and thus serve the purpose of the potassium vapor in the above described method of processing the tube.

In the most desirable embodiment of the invention, care is taken to ensure that no alkali metal is permitted to remain in the lamp tube to contact with the gaseous medium subsequently introduced into the tube. If alkali metal were allowed to remain in the tube, it would cause progressive lowering of the pressure within the tube due to measurable absorption of neon. The conductivity of the rarefied gaseous medium would thereby be lessened and the luminosity or brilliancy thereof would also be adversely affected.

A typical form of the finished luminous discharge tube is shown in Fig. 2, where A—A indicates the enlarged end portions having the external coatings $a$—$a$ of silver or other easily deposited metal, which constitute the external electrodes. In the form illustrated the terminal or electrode portions A—A are shown larger or of greater diameter than the intermediate portion, but this is not essential to the invention in its broader aspect, their size being governed to a large extent by the frequency of the current used, the important point being that the relation be such that, in operation, the impedance of the gas in the tube will be greater than that of the electrode system. That is, the distribution of impedance in the system as a whole, should be such that the energy loss occurs chiefly in the gas in the tube and relatively little in the glass electrode system. In achieving this result, operating frequencies of the order of 750,000 cycles per second can be used with good results. The use of frequencies of this order permits the use of relatively small external electrodes which makes such frequencies especially desirable.

In the operating circuit arrangement shown in Fig. 2, leads 25 and 26 connect the external electrodes $a$—$a$ of the tube with the secondary windings 27 and 28 of Tesla coils, of which the primaries indicated at 29 and 30 are oppositely wound. The windings 29 and 39 are included in an oscillating circuit actuated by the circuit breaker 31, connected with a suitable current source through binding posts 33, the oscillator circuit comprising the windings 29 and 30 and the condenser 32 connected as shown. Other circuit arrangements may be used for accomplishing the same result but that here shown is simple and convenient. In constructing the oscillator, the usual precautions necessary to guard against losses in high frequency circuits should be observed.

In Fig. 3 is shown a modified form of external electrode which may be used at each end of the lamp tube instead of those shown in Fig. 2. The electrode as a whole is indicated at A', and comprises a chamber 33 formed by inner and outer walls 34 and 35, formed on the lamp tube, said chamber 33 being filled with graphite or other conductive material in powdered form, lead 37, sealed in position at 36, being provided for application of operating potential.

It will be obvious that if interior electrodes are used, they may be of any usual construction, the discharge between them being effected by sources of electrical potential with which the art is familiar. When such electrodes are used, the processing of the tube will be carried out as above explained resulting not only in the elimination of gases or other impurities from the tube walls, but also from the walls of the electrodes.

As is well known in the manufacture of luminous tubes with a gaseous conducting medium of neon and with interior electrodes, it is the practice to subject the tubes both during and after exhaustion to the effect of a current, which during the exhausting operation is of considerably greater magnitude than is employed under working conditions, this seasoning being continued for a number of hours. In this way, the gaseous impurities in the neon are gradually absorbed by the metal film formed on the tube walls by vaporization of the electrodes. By subjecting the tube to the initial processing as I have explained, the purification is so complete as to make any seasoning of the tube unnecessary and therefore neon tubes with internal electrodes constructed in accordance with my present invention may be put into use immediately after manufacture.

In the foregoing description, reference has been made more particularly to the employment of neon as a rarefied medium employed in the lamp tube. It is to be understood, however, that the invention is not restricted to the use of neon but extends also to the manufacture of discharge tubes of the general type mentioned whether neon be employed as the rarefied gaseous medium or some other gas of the noble gas group such as helium, krypton, xenon, argon, or the like, or any combination of these gases; or neon or any other suitable gas, together with the vapors of metals such as mercury or iodine or other combinations for the purpose of obtaining various color effects.

This application is a continuation of applicant's copending application Serial No. 26,128, filed April 27, 1925.

What I claim is:

1. The method of making a luminous electrical discharge tube, containing a conducting gas of the noble gas group, which comprises purging the walls of the tube by means of an agent adapted to coact with substances capable of absorbing or contaminating the gas during operation of the tube to an extent sufficient to commercially impair the color or amount of light produced, and thereafter filling the tube with the conducting gas at low pressure and sealing the same.

2. The method of making a luminous electrical discharge tube according to claim 1 in which the purging agent is an alkali metal vapor.

3. The method of making a luminous electrical discharge tube which comprises purging the walls of the tube of undesirable substances by causing said substances to coact with an agent to such an extent that the spectrum of the initial gas filling indicates the absence of impurities.

4. In the manufacture of luminous electrical discharge tubes of glass containing a conducting gas of the noble gas group, the method of purging the walls of the tube of substances capable of impairing the operating qualities of the gas, which comprises heating the tube and, while maintaining the same at a high temperature, evacuating the same, diffusing an alkali metal vapor into the tube which vapor does not condense at the temperature used, maintaining an electrical discharge therethrough, and continuing the heating until the alkali metal is removed.

5. The method of making luminous electrical discharge tubes of glass containing a conducting gas of the noble group which comprises purging the walls of the tube of substances capable of impairing the operating qualities of the gas, by heating the tube to a temperature between 300° and 500° C. while maintaining evacuation of the tube, distilling into and diffusing therethrough an alkali metal, the vapor of which does not condense at the temperature used, and maintaining an electrical discharge therethrough continuing the heating until the alkali metal is substantially all removed, then discontinuing the electrical discharge, cooling the tube, filling the same with the desired gas at low pressure previously purified to a degree sufficient to give the operating qualities desired, and sealing the tube.

6. In the manufacture of electrical discharge tubes of glass for lighting purposes containing a conducting gas of the noble gas group, the method of purging the tube of substances capable of impairing the operating qualities of the gas to be used in the tube, which comprises heating the tube and maintaining it at a temperature of the order of 300 degrees centigrade, while diffusing the vapor of an alkali metal through the tube, exhausting the tube of the metal vapor and other vapors and gases formed, and maintaining an electrical discharge through the tube by way of terminal connections out of physical contact with the contents of the tube, then discontinuing the electrical discharge, cooling the tube, admitting the conducting gas into the tube at a low pressure, and sealing off the tube.

7. In the manufacture of luminous discharge tubes of glass of the boro-silica type containing a conducting gas of the noble gas group, the method of purging the tube of substances capable of impairing the operating qualities of the gas to be used as the luminous medium within the tube, which comprises heating the tube to a temperature of approximately 500 degrees centigrade while evacuating the same and continuing this treatment until the degasification of the tube is carried to a stage where most of the impurities are removed, then introducing potassium vapor into the tube and passing an electrical discharge through the tube by means of electrodes out of physical contact with the interior of the tube, continuing the discharge and heating until and some time after the tube is filled with light, then discontinuing the discharge, cooling the tube, admitting the gas to be used as the luminous medium, and sealing off the tube.

8. In the manufacture of vacuum tubes, the step of purging a tube of impurities which comprises passing an electrical discharge through said tube while it is in heated condition and contains a purging agent in vapor form at low pressure, the temperature of the tube being sufficient to prevent condensation of the vapor.

9. In the manufacture of vacuum tubes, the step of purging a tube of impurities which comprises passing a high frequency electrical discharge through said tube while it is in heated condition and contains potassium vapor at low pressure, the temperature of the tube being sufficient to prevent condensation of said vapor.

10. An electrical discharge device for illuminating purposes comprising a glass tube of which the interior is free of substances capable of absorbing or contaminating a conducting gas in quantity sufficient to commercially impair the color or amount of light produced by such gas when energized by passage of an electrical discharge therethrough, said tube containing a conducting gas sealed therein and under low pressure, and a pair of external electrodes for effecting electrical connection with the gas content by capacity coupling.

11. An electrical discharge tube of the character described composed of high-melting boro-silica glass and containing a luminescent gaseous medium at low pressure, and being free of discoloration, the interior of said tube being free of substances capable of absorbing or contaminating a conducting gas such as neon in quantity sufficient to commercially impair the color or amount of light produced by such gas when energized by passage of an electrical discharge therethrough.

RAYMOND ROBERT MACHLETT.